United States Patent [19]

Lina et al.

[11] Patent Number: 4,966,535

[45] Date of Patent: Oct. 30, 1990

[54] NON-RETURN VALVE FOR ADMITTING A LIQUID TO BE SPRAYED INTO A PUMP CHAMBER, AND UTILIZATION THEREOF

[75] Inventors: Jean-Pierre Lina, Le Neubourg; Patrick Di Giovanni, Elbeuf, both of France

[73] Assignee: Valois, Le Neubourg, France

[21] Appl. No.: 461,498

[22] Filed: Jan. 5, 1990

[30] Foreign Application Priority Data

Jan. 6, 1989 [FR] France ................................ 89 00127

[51] Int. Cl.[5] ................................................ F16K 15/02

[52] U.S. Cl. ................................ 417/553; 137/533.19; 137/856

[58] Field of Search ............... 417/510, 595, 549, 553; 137/533.17, 533.19, 855, 856

[56] References Cited

U.S. PATENT DOCUMENTS

| | | | |
|---|---|---|---|
| 3,245,669 | 4/1966 | Higgins et al. | 137/533.17 X |
| 3,572,377 | 3/1971 | Graham et al. | 137/533.19 X |
| 3,991,914 | 11/1976 | Kotuly et al. | 137/533.17 X |
| 4,655,248 | 4/1987 | Chalaire | 137/533.17 X |

*Primary Examiner*—John C. Fox

*Attorney, Agent, or Firm*—Sughrue, Mion, Zinn, Macpeak and Seas

[57] ABSTRACT

Some precompression pumps currently used for spraying a liquid include a non-return valve formed by a gasket (3) held captive between the base of the pump body (1) and a sleeve (2). This non-return valve determines the extent to which the pump chamber (19) is isolated from or put into communication with a supply of liquid, as a function of whether the gasket (3) bears against the base of the pump body (1) or against the sleeve (2), closing a central hole through the pump body or being held off a central hole through the sleeve. In order to make valve operation more reproducible the present valve has the following features: the base of the pump body (1) is in the form of a cup (18) of small slope; the side wall (28) of the sleeve (2) flares from the end (26) of the sleeve (2) and has a local swelling (27), with the side wall (28) being of reduced thickness on either side of the swelling (27); and the end (26) of the sleeve (2) includes a tongue (25) and two ribs (2*b*), the tongue (25) and the ribs (2*b*) extend from the side wall (28) of the sleeve (2) all they way to its central hole (2*a*), the tongue (25) is diametrically opposite the swelling (27) and it is thickest adjacent to the central hole (3*a*), the ribs (2*b*) are disposed symmetrically about the diameter passing through the swelling (27) and the tongue (25) such that each of them forms an acute angle with the diameter on either side of the swelling (27).

8 Claims, 3 Drawing Sheets

NON-RETURN VALVE FOR ADMITTING A LIQUID TO BE SPRAYED INTO A PUMP CHAMBER, AND UTILIZATION THEREOF

The present invention relates to a non-return valve for admitting a liquid to be sprayed into a pump chamber. More precisely, the valve is designed to open and close in a particularly reproducible manner from one actuation of the pump to another. It is advantageously used with certain precompression pumps of the type disclosed in U.S. Pat. No. 4 245 967.

BACKGROUND OF THE INVENTION

The corresponding prior art pump is described below in order to specify the function of the non-return valve of the present invention. This description also serves to show up the shortcomings of admission valves as used in the past. The description is made with reference to a longitudinal section in FIG. 1 of the accompanying drawings. This figure shows a precompression pump intended for crimping in sealed manner onto a can (not shown) by means of a capsule 10 and gaskets 9*a* and 9*b*. When actuated, the pump must be held in the vertical position, as shown.

Thus, the prior art precompression pump is essentially protected by a pump cylinder 1. The narrow end 12 of the cylinder 1 communicates with the supply of liquid to be emitted (generally via a dip tube, not shown). Between the end 12 and the hollow body 11 of the cylinder 1 there is a non-return valve constituted in the example shown by a disk-shaped gasket 3 and a sleeve 2 for guiding the gasket 3. A piston 5 is free to move inside the body 11. The piston is provided with outer sealing lips 5*a*. Together with the non-return valve, these lips define a pump chamber 19 which is thus isolated in the bottom portion of the body 11. The piston 5 has a central opening 5*b* which receives a rod 4 having a blind channel 4*a* therein which opens out sideways via an orifice 4*b*. The rod 4 and the piston 5 are designed so that a spring 7, when compressed, allows the rod 4 to move relative to the piston 5. Thus, the orifice 4*b* may move from the position shown in FIG. 1 where it is closed by the piston 5 to a position in which it is communication with the pump chamber 19. Finally, within the pump chamber there are a return spring 8 which is less stiff than the spring 7, and a ring 6 whose essential function is to ensure very good sealing between the piston 5 and the rod 4.

When a user presses down the rod 4, this gives rise initially to the piston 5 being lowered within the body 11 of the pump cylinder 1 under drive from the spring 7. However, this movement remains extremely limited. The gasket 3 bears against an upstanding lip la projecting from the base of the body 11 and isolating the pump chamber 19. The incompressibility of the liquid contained therein therefore stops the stroke of the piston 5 while the pressure inside the chamber 19 increases. The main effect of the user's action is thus to compress the spring 7. This occurs when the pressure in the pump chamber 19 reaches a certain threshold relative to the stiffness of the spring 7. This threshold is the reason for the pump being referred to as a "precompression" pump since, once the threshold is exceeded, the chamber 19 is put into communication with the outside via the orifice 4*b* and the channel 4*a*, thereby allowing the liquid to flow. It is then the turn of the spring 8 to be compressed while the volume of the chamber 19 is reduced. Liquid continues to be emitted until the base 6*a* of the ring 6 comes into abutment against the surface of the sleeve 2.

The user then ceases to press down the rod 4. The stiffer spring 7 is the first to return to its initial position, thereby raising the rod 4 through the opening 5*b* in the piston 5. As a result the path to the outside via the hole 4*b* and the channel 4*a* closes. Thereafter, the spring 8 expands in turn and the pressure inside the pump chamber 19 falls. This causes the gasket 3 to be sucked up to the top of the guide sleeve 2, thereby putting the chamber 19 into communication with the inside of the liquid-containing can. The liquid is thus admitted into the chamber 19 by passing round the gasket 3. Ribs 2*b* on the top of the sleeve 2 serve to prevent the gasket 3 from closing the central hole 2*a* through the sleeve. Once the pump chamber 19 has returned to its original size, it is again filled with liquid and the pressure on either side of the gasket 3 comes back into equilibrium. With the prior art non-return valve shown in FIG. 1, it is then hoped that gravity will return the gasket 3 to rest against the lip at the base of the body 11, thereby isolating the pump chamber 19 in order to prepare it for subsequent actuation.

However, the gasket 3 does not always return to its proper place, as expected. It often ends up at an angle inside the sleeve 2. Then, when the precompression pump is actuated again, the pump chamber 19 remains in communication with the supply of liquid to be sprayed. The pressure inside the chamber 19 therefore does not increase and as a result the spring 7 is not compressed so the liquid-emitting passage does not open. This faulty operation occurs above all when a gas is to be pumped (for example when priming the pump). In this case, the gasket 3*a* tends to remain stuck to the top of the sleeve 2 by a skin effect (e.g. due to the appearance of static electricity).

Naturally, from the user's point of view, the resulting random operation is hardly encouraging. Indeed, for pharmaceutical substances which need to be dispensed in accurate doses, this defect may proscribe using such a pump. The defect also produces a problem for the manufacturer of the pump. Pumps are tested prior to being sold, and the test commonly used for evaluating pump performance consists in actuating a pump three times when it is mounted on a supply of air. The pressure drop created in this way in the air supply is used as a criterion for distinguishing between good operation and bad. Thus, pumps in which the gasket 3 does not return properly in the presence of air during the test strokes are rejected even though such pumps would work perfectly well in the presence of the liquids for which they are designed. The high reject rate thus constitutes a significant loss of income for the manufacturer.

As a result, the admission valve of the present invention seeks to reduce the random nature of pump operation very considerably, particularly when the pump is operated in the presence of a gas. The gasket 3 must return every time into its proper place for effectively preventing communication between the pump chamber 19 and the inside of the can.

SUMMARY OF THE INVENTION

To this end, the present invention provides a non-return valve for admitting a liquid to be sprayed into a pump chamber, said valve being constituted by co-operation between three components:

a pump cylinder having an internal narrowing separating a body and an end, said body housing said pump chamber whereas said end is in communication with a supply of said liquid;

a hollow sleeve having an end pierced by a central hole and a side wall suitable for being received in sealed manner inside said body such that said sleeve and said narrowing together define a housing; and a gasket in the form of a disk suitable for being received with clearance inside said housing;

wherein:

said narrowing is shaped, on its side adjacent said body, in the form of a cup of small slope;

said side wall of said sleeve flares from said end of said sleeve and is locally provided with a swelling, said side wall of said sleeve being of reduced thickness on either side of said swelling; and said end of said sleeve includes a tongue and two ribs, said tongue and said ribs extending from said side wall of said sleeve to the central hole of said sleeve, said tongue being diametrically opposite said swelling and being of increased thickness adjacent to said central hole of said sleeve, said ribs being symmetrically disposed about a diameter passing through said swelling and said tongue so that each of them forms an acute angle with said diameter on respective sides of said swelling.

Other features of a non-return valve of the present invention are specified in the dependent claims below. These claims also relate to advantageous utilization of the present valve in association with known pumps.

During tests performed on precompression pumps of the type defined above, the non-return valve has been shown to be particularly effective. When testing pumps using the method outlined above, the reject rate has been considerably reduced. In addition, the doses ejected from one pump stroke to another have been shown to be particularly uniform. Finally, pumps provided with a valve of the invention are capable of operating upsidedown, which is not possible with gravity-operated valves of the prior art.

BRIEF DESCRIPTION OF THE DRAWINGS

An embodiment of the invention is described by way of example with reference to the accompanying drawings, in which.

DETAILED DESCRIPTION

Figure 1:
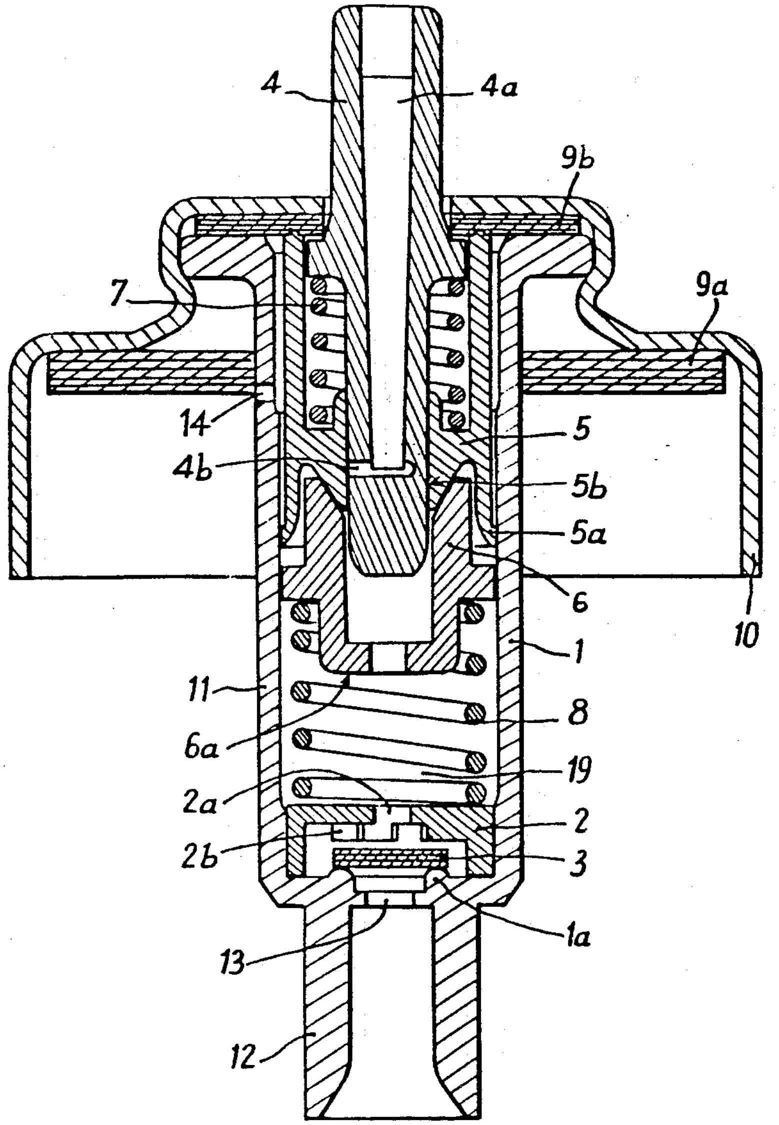
Fig:1 PRIOR ART
FIG. 1 is a longitudinal section through a precompression pump including a prior art admission valve.
Figure 2:
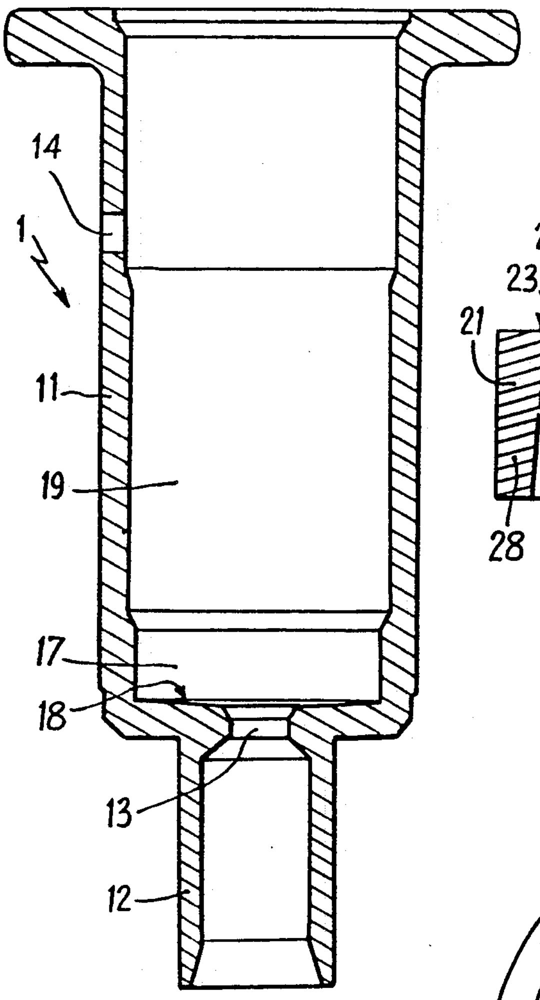
FIG. 2 is a longitudinal section through a pump cylinder for receiving a precompression pump similar to that shown in FIG. 1, but provided with a valve seat so as to constitute a first element of an embodiment of an admission non-return valve in accordance with the present invention.

The pump cylinder 1 shown in FIG. 2 is very similar to that used in the prior art as shown in FIG. 1 and described above. The only differences that need mentioning occur at the base of the body 11 where it connects to the narrow portion 12 of the cylinder 1. No bearing lip **1*a* is provided in this case. Instead, the base of the body 11 has a smooth inside wall 18. However, this wall slopes slightly to form a conical cup sloping at an angle of about 1° to about 6°. Communication 13 between the supply of liquid to be sprayed and the pump chamber 19 may also be different in section from the prior art. On either side of a cylindrical length, there are flared conical portions defining the communication 13 both into the pump chamber 19 and into the narrow portion 12** located inside the can.

Figure 3:
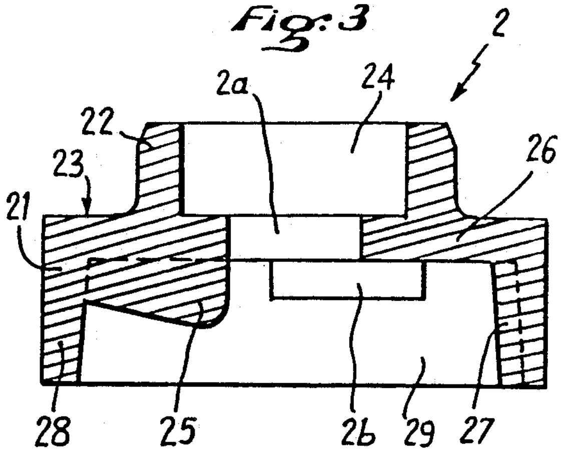
FIG. 3 is a longitudinal section through a guide sleeve constituting a second element of an embodiment of an admission non-return valve of the present invention.
Figure 4:
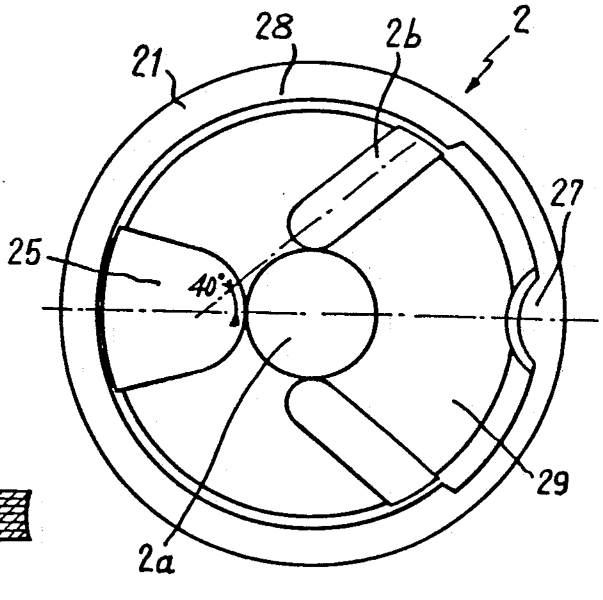
FIG. 4 is a view of the FIG. 3 guide sleeve, seen from below.

As in the prior art, the bottom portion of the pump cylinder 1 includes an opening 17 for receiving a close-fitting guide sleeve 2. However, the sleeve is different. FIGS. 3 and 4 show the shape of sleeve used in the present invention. Before continuing with the description, it must be emphasized that the sleeve is shown at a scale different from FIG. 2. Its scale is also much larger than lifesize where the real dimensions of the sleeve are more like 6 mm diameter and 4 mm high.

The sleeve 2 in the embodiment shown of the present invention is in the form of a hollow cylinder having a bottom portion 21 which is larger than its top portion 22 (see FIG. 3). The change in section between these two portions defines a shoulder 23 against which the return spring 18 bears. The inside section of the sleeve 2 is thus larger in the bottom portion 21 (opening 29) than in its top portion 22 (opening 24). These two openings are put into communication via a central hole **2*a***.

The shapes of the inside walls of the bottom opening 29 are particularly advantageous in the context of the present invention (see FIG. 4). In general, the side wall 28 flares towards the base of the sleeve 2 at an angle of about 4°. However, it has a small, inwardly-directed, local swelling 27. On either side of the swelling, it should be observed that the wall 28 is locally of reduced thickness. The end 26 of the opening 29 is flat. It also has three projections. There is a tongue 25 disposed diametrically opposite the swelling 27 and running from the side wall 28 all the way to the central hole **2*a*. The section of FIG. 3 shows that this tongue 25 is thicker close to the hole 2*a*. For example, its face may slope at 15° relative to the plane of the end 26. There are also two ribs 2*b* which likewise extend from the side wall 28 all the way to the central hole 2*a*. These ribs are disposed symmetrically about the diameter passing through the center of the tongue 25 and the swelling 27. Their respective axes form an acute angle with said diameter (about 40°, for example). In the embodiment shown in FIG. 4, the side wall 28 is of slightly reduced thickness over the small arc between the two ribs 2*b***.

Figure 5:
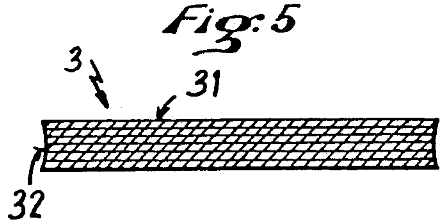
FIG. 5 is a longitudinal section through a gasket constituting a third element of an embodiment of an admission non-return valve in accordance with the present invention.

A gasket 3 is designed to be placed inside the opening 29 of the sleeve 2. In FIG. 5, the gasket is shown in section at the same scale as the sleeve 2 in FIGS. 3 and 4. It is constituted by a small elastomer or plastomer disk having plane faces 31. The way this type of gasket is manufactured by punching often leads to it having a somewhat dished edge 32.

Figure 6:
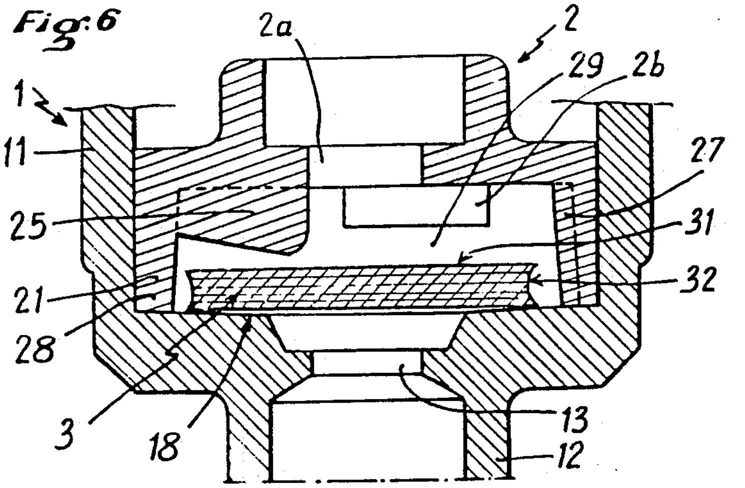
FIGS. 6 to 8 are longitudinal sections through the same embodiment of a non-return admission valve of the invention, with FIG. 6 showing the gasket immediately after being put into place inside a pump cylinder and its guide sleeve, while FIGS. 7 and 8 respectively show a stage during which substance contained in the pump chamber is being emitted, and a stage during which substance is being admitted into the chamber.
Figure 7:
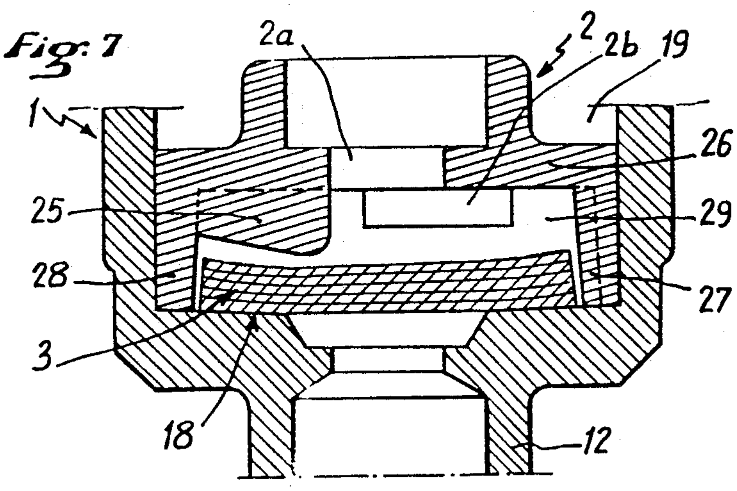
Figure 8:
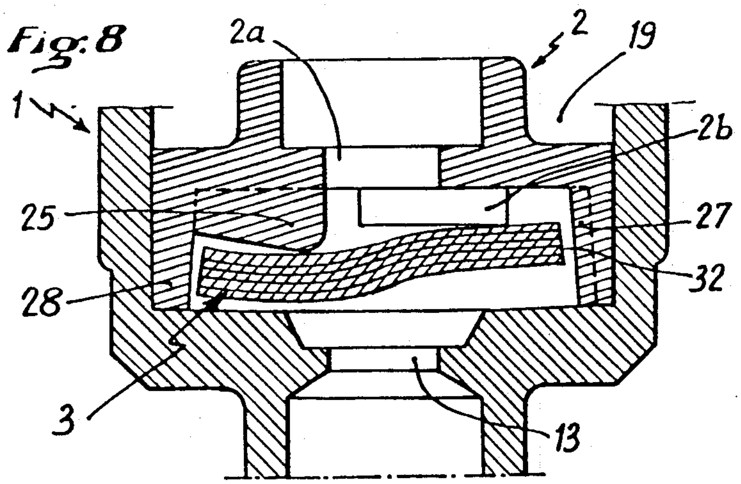

The non-return valve of the invention is constituted by assembling the three items described above individually. FIGS. 6 to 8 serve to explain how it operates. When the gasket 3 is placed in the opening 29, it is in air. It then rests against the bottom of the cup 18 in the body 11 of the pump cylinder 1 (see FIG. 6). Once the pump has been primed, the gasket 3 is immersed in liquid, but it remains in substantially the same position. Although the substance from which the gasket is made does indeed absorb some liquid, thereby increasing in volume, in this embodiment of the present invention, it is quite acceptable for the gasket to swell a little, e.g. by about 10%. The gasket 3 remains relatively free to move and thus retains all the operational characteristics of a gravity-operated gasket. Indeed, it can be advantageous to ballast the present gasket. With increased mass, and when the mechanism described in the following paragraph is implemented, then the non-return admission valve to the pump chamber 19, as constituted by the gasket together with the pump cylinder 1 and the sleeve 2, will be closed more quickly.

While the pressure inside the pump chamber 19 is rising, the gasket 3 is pressed against the cup 18 as shown in FIG. 7. The large contact area established in this way ensures that the gasket provides a good seal. Any liquid trapped in the chamber 19 is thus prevented from returning into the can. While the pressure in the pump chamber 19 is reduced, the gasket is raised by suction. It then takes up the shape shown in FIG. 8. The portion of the gasket 3 held by the tongue 25 remains substantially in place, whereas elsewhere the gasket 3 bears against the ribs 2*b*. The substance can thus be admitted into the pump chamber 19 by flowing through the hole 19 and then round the edge 32 of the gasket 3 before finally passing between the ribs 29 to the central hole 2*a* in the sleeve 2. The swelling 29 ensures that this flow path is released even if the gasket 3 moves horizontally. In addition, the reduced thickness of the side wall 28 of the sleeve 2 on either side of the swelling prevents too great a headloss appearing in this flow. Finally, when the chamber 19 is full again, the gasket 3 has no difficulty in returning to the position shown in FIG. 7. Given the generally flared shape of the side wall 28 of the sleeve 2, its area of contact with the gasket 3, if any, is limited. There is therefore no risk of the gasket adhering or catching on the sleeve, so the gasket returns reliably against its seat constituted by the cup 18.

As a result, the present invention provides several improvements compared with the prior art:

the contact area between the gasket 3 and the base of the body 11 is increased by nearly 70% by using a cup 28 instead of a bearing lip 1*a*;

the gasket 3 is held vertically by a tongue 25;

the gasket 3 is guided horizontally by a lateral swelling 27;

any possible contact between the gasket 3 and the side wall 28 of the sleeve 2 is limited by virtue of said side wall being flared; and the flow path is locally enlarged by the reduced thickness of the side wall 28 of the sleeve 2.

Each of these improvements improves, inter alia, a particular aspect of the operation of the admission valve:

when closed, the valve provides better sealing by eliminating difficulties in providing the bearing lip 1*a*;

the gasket 3 necessarily returns to its rest position, and in particular its return no longer makes use of gravity, and as a result skin effects which could oppose the return are eliminated; and head losses during admission of the substance into the pump chamber 19 are reduced.

Overall the results obtained are most conclusive. For example, during a test which consists in sucking up a colored liquid in a column capped by a precompression pump, ten pump actuations have shown:

liquid rising through 34 cm using a prior art valve; and liquid rising through 73 cm using a valve of the present invention.

When tests were restarted, the pump provided with the prior art valve raised the liquid 41 cm, whereas the pump using the valve of the present invention raised the liquid through exactly the same 73 cm.

The present admission non-return valve for a pump chamber is particularly advantageous when used in association both with a pump that prevents air from being sucked back in and with a receptacle which is deformable. Although not mentioned so far, the pump shown in axial section in FIG. 1 has an air intake. In other words, its cylinder 1 is pierced by an opening 14 (also visible in FIG. 2) disposed at a level such that the sealing lip 5*a* around the periphery of the piston 5 is always beneath it. Thus, when the piston 5 returns to its rest position, air can be admitted into the receptacle (not shown) onto which the pump is crimped in sealed manner. As a result the supply of liquid remaining therein is maintained at atmospheric pressure.

However, some liquids, such as some medicines, for example, are not suited for making contact with ambient air. The present trend is to package such liquids in receptacles having a deformable envelope which is hermetically closed by a dispensing pump. The pump consequently does not have an air intake (i.e. its cylinder 1 does not include the opening 14). Each time liquid is expelled, the volume of the receptacle shrinks and its envelope is consequently deformed. However, the envelope usually opposes such deformation to some extent. As a result the inside of the receptacle is kept at a pressure which is lower than atmospheric pressure, with the internal pressure $P_O$ differing from atmospheric pressure by an ever increasing amount as the deformation of the envelope increases.

In this case, the present gasket 3 serves to isolate the inside of the receptacle from the pump chamber. During the transient stage of admission into the chamber, the chamber is at a pressure $P_2$ which is further below atmospheric pressure than is the pressure $P_O$ in the receptacle ($P_O > P_2$). It may also be assumed that, because of its inertia, the envelope begins by following the reduction in volume of its contents so that $P_O$ is maintained inside the receptacle throughout admission. However, once the chamber has been filled and consequently the pressure $P_O$ tends to equalize on both sides of the gasket, the envelope seeks to return to its original shape. This has the effect of further reducing the pressure inside the receptacle which becomes equal to P,where $P_1 < P_O$. This means that the gasket 3 is immediately sucked down against the cup 18 while participating in maintaining the pressure $P_O$ inside the pump chamber. This has the happy effect of reducing the stress applied to the sealing lip 5*a* of the piston 5 which, because of its primary function, is poorly adapted to providing isolation when the internal pressure is reduced. As a result the protection provided against air for the substance packaged using such a valve is further increased.

We claim:

1. A non-return valve for admitting a liquid to be sprayed into a pump chamber, said valve being constituted by co-operation between three components:

a pump cylinder having an internal narrowing separating a body and an end, said body housing said pump chamber whereas said end is in communication with a supply of said liquid;

a hollow sleeve having an end pierced by a central hole and a side wall suitable for being received in sealed manner inside said body such that said sleeve and said narrowing together define a housing; and a gasket in the form of a disk suitable for being received with clearance inside said housing;

wherein:

said narrowing is shaped, on its side adjacent said body, in the form of a cup of small slope;

said side wall of said sleeve flares from said end of said sleeve and is locally provided with a swelling, said side wall of said sleeve being of reduced thickness on either side of said swelling; and said end of said sleeve includes a tongue and two ribs, said tongue and said ribs extending from said side wall of said sleeve to the central hole of said sleeve, said tongue being diametrically opposite said swelling and being of increased thickness adjacent to said central hole of said sleeve, said ribs being symmetrically disposed about a diameter passing through said swelling and said tongue so that each of them forms an acute angle with said diameter on respective sides of said swelling.

2. A valve according to claim 1, wherein said slope of said cup lies in the range 1° to 6°.

3. A valve according to claim 1, wherein said side wall of said sleeve flares with an angle of 4° relative to the normal to said end of said sleeve.

4. A valve according to claim 1, wherein said reduced thickness of said side wall of said sleeve extends on either side of said swelling between said ribs.

5. A valve according to claim 1, wherein said acute angle between each of said ribs and said diameter passing through said swelling and said tongue is approximately 40°.

6. A valve according to claim 1, wherein said tongue has a face sloping at 15° relative to said end of said sleeve.

7. A valve according to claim 1, wherein said gasket is constituted by an elastomer or a plastomer which swells in the presence of liquid, with said gasket increasing by up to 10% in volume.

8. A valve according to claim 1, wherein said gasket is constituted by an elastomer or a plastomer which is ballasted so that its mass is sufficient for ensuring that said gasket moves inside its housing under the effect of gravity.

* * * * *